United States Patent [19]

Asada et al.

[11] 4,328,838

[45] May 11, 1982

[54] THICK AND TOUGH CELLOPHANE FOR CASINGS AND METHOD OF PREPARING THE SAME

[75] Inventors: Kosaku Asada, Toyoda; Hiroo Maeno, Osaka, both of Japan

[73] Assignee: Kanegafuchi Kagaku Kogyo Kabushiki Kaisha, Osaka, Japan

[21] Appl. No.: 43,632

[22] Filed: May 30, 1979

Related U.S. Application Data

[63] Continuation-in-part of Ser. No. 949,395, Oct. 6, 1978, abandoned.

[30] Foreign Application Priority Data

Oct. 19, 1977 [JP] Japan .............................. 52-126030

[51] Int. Cl.³ .......................... C08L 1/24; D01F 2/06; F16L 11/00
[52] U.S. Cl. ............................... 138/118.1; 106/168; 264/198; 264/208; 426/135
[58] Field of Search ................ 264/208, 198; 106/168; 138/118.1

[56] References Cited

U.S. PATENT DOCUMENTS

| | | | |
|---|---|---|---|
| 1,683,200 | 9/1928 | Lilienfeld | 264/198 |
| 1,997,349 | 4/1935 | Schwalbe et al. | 264/196 |
| 2,176,925 | 10/1939 | Reichel et al. | 264/208 |
| 2,271,932 | 2/1942 | Atkinson | 264/198 |
| 3,877,968 | 4/1975 | Maeno et al. | 106/168 |

*Primary Examiner*—Theodore Morris
*Attorney, Agent, or Firm*—Moonray Kojima

[57] ABSTRACT

Thick and tough cellophane for casings is provided wherein viscose is passed through an aqueous coagulation solution containing 15 to 30 weight percent of middle or higher alcohol and/or polyhydric alcohol, the coagulated viscose film being subjected to tension in its horizontal direction in the process of coagulation during passage in the coagulation solution. Thicker and tougher casing cellophane is provided wherein the coagulated viscose film exiting from the coagulation solution is further passed through a second aqueous coagulation solution containing inorganic acid and metallic salt thereof, the coagulated viscose film being subjected to tension in its horizontal direction during passage in the coagulation solution.

8 Claims, 4 Drawing Figures

THICK AND TOUGH CELLOPHANE FOR CASINGS AND METHOD OF PREPARING THE SAME

This is a continuation in part of Ser. No. 949,395 filed Oct. 6, 1978, and now abandoned.

DETAILED DESCRIPTION OF THE INVENTION

The present invention relates to cellophane for casings and a method of preparing the same, more particularly, aims at offering a thick and tough cellophane used for casings advantageously and industrially without release of pollution causing materials to environments and further without employment of a paper as a base material.

Cellophane casings have been prepared and sold in a small quantity. Those are thin in thickness and consequently limited to casings of, for example, Vienna sausages in which the small diameter (up to about 2 cm in ½ circumference) is only required and load bearing or internal pressure is small. For the casings of a big size (more than about 10 cm in ½ circumference) for loin roll hams and press hams, fibrous casings are employed which are obtained by impregnating a base paper with viscose. Fibrous casings are produced usually by coating or impregnating a tough paper of 30 g per square meter with about twice the volume (as regenerated cellulose) of viscose, then coagulating and fixing viscose onto the paper. Hams packed with the casings thus obtained decrease the commercial value in a fine appearance and a sense of cleanness due to poor transparency. Furthermore, the co-presence of a paper and regenerated cellulose, which are physically heterogeneous materials, causes wrinkles and rarely brings about peeling between two layers.

On the other hand, synthetic resin films satisfy a need of transparency but are not used since various problems arise at the step of smoking which is very important to hams production.

Accordingly, though purely cellophane casings have been long felt in order to solve the foregoing problems, tough and thick cellophane casings have been produced nowhere in the world. The reasons will be surmised as below:

When thick cellophane is produced a large quantity of viscose has to be coagulated in the coagulation solution. In the coagulation solution mainly comprising inorganic acids and the salts thereof, which is commonly employed, coagulation and regeneration of cellulose tends to occur instantaneously. Only the surface of viscose contacted with the coagulation solution is therefore reacted and coagulated to form a thin film in such an instant that impregnation or contact of the coagulation solution with unreacted viscose is interrupted to result in the product lacking in uniformity and toughness. Even though the ostensibly desired product is obtained in disregard of productivity, cost and the like, a large amount of minute particles of sulfur, sulfides and the like by-produced concurrently with regeneration of cellulose in the conventional coagulation method in which neutralization reaction with an acidic solution takes place dominantly reside in the depths of cellophane produced, so that desulfurization and washing of a thick cellophane are very difficult. Those inevitably limit the thickness of cellophane produced commercially and industrially. Furthermore, even though a thick cellophane in the same type as now commercially available had been obtained, it would have been unsuitable for a large type of casings, since it is expanded in one direction (longitudinal direction) to result in weakness in tensile strength in a horizontal direction so that it cannot stand the internal pressure given in all directions after being filled with ham meat and load borne at the time of handling.

It is an object of the present invention to provide a tough and thick cellophane for casings and a method for producing the same in a commercially advantageous manner.

It is another object of the present invention to provide a production method of casings cellophane which is free from environmental pollution.

These and other objects, features and advantages of the present invention will become apparent to those skilled in the art from the following description and the appended claims.

The inventors of the present invention have found out through a series of studies that the foregoing objects can be achieved by passing viscose through the coagulation solution comprising 15 to 30 weight percent of mainly middle or higher alcohols and/or polyhydric alcohols, resulting coagulated viscose film being tensed to expand the width.

The feature of the present invention is to employ the coagulation solution comprising middle or higher alcohols and/or polyhydric alcohols as main components, more preferably containing ammonium salts, while acids being used in only such an amount required to adjust free alkali, and to tense the resultant coagulated viscose film to and along the horizontal direction to control strong orientation to the longitudinal (flowing) direction, thereby uniform and homogeneous coagulation and facilitating the countermeasures to environmental pollution being accomplished.

Another feature of the present invention is to complete the tough film formation of regenerated cellulose while further coagulating and tensing in the second coagulation.

The alcohols coagulation solution of the present invention enables the substitution reaction (1) shown below to take place to the depths of viscose film rapidly and uniformly, and thus solidification occurs easily to produce a thick film in a high quality without by-producing sulfides.

In the present invention middle or higher alcohols and/or polyhydric alcohols are employed as main components in the coagulation solution, wherein the following chemical reactions take place:

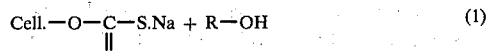

$$\text{Cell.}-\text{O}-\underset{\underset{S}{\|}}{C}-S.Na + R-OH \quad (1)$$

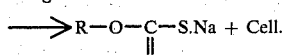

$$\longrightarrow R-O-\underset{\underset{S}{\|}}{C}-S.Na + \text{Cell.}$$

$$\text{Cell.}-\text{O}-\underset{\underset{S}{\|}}{C}-S.Na + H_2SO_4 \quad (2)$$

$$\longrightarrow CS_2 + Na_2SO_4 + \text{Cell.}^*$$

(*Conventional acidic coagulation method)

In U.S. Pat. No. 3,877,968 H. Maeno one of inventors of the present invention disclosed a fibrous paper for casings and a method therefor wherein the fibrous paper is prepared by impregnating a thin base paper with alkali cellulose xanthate solution, subjecting the impregnated paper to the treatment with lower alcohols such as methanol and ethanol to produce regenerated cellulose. In the all cellophane casings having no base paper functioning as a reinforcement, however, the film per se has to be tough and strong and lower alcohols were found improper to the case. That is, lower alcohols react so rapidly that they do not serve the purpose of the present invention of solidifying viscose film and under tension controlling crystalline orientation to increase toughness. In said U.S. Patent the impregnated paper with viscose is coiled, while being expanded, around the stainless pipe, then treated with the coagulation solution. It is thus preferred to employ lower alcohols which are rapid to react in order to prevent shrinking upon coagulation by the stainless pipe, but in non-fibrous casings employing no base paper, as in the present invention, the purposes cannot be attained without using middle or higher alcohols and/or polyhydric alcohols which are relatively slow to react. Moreover, the present invention also aims at propelling environmental pollution countermeasures more effectively that as a measure of eliminating offensive odors alcohol xanthate solution is transported to another place where it is decomposed with acid to recover $CS_2$ and alcohols. To make it more effective and feasible, it is indispensable to the present invention to employ the coagulation solution mainly containing middle or higher alcohols which have a great difference in the boiling point from $CS_2$.

Viscose used in the present invention may be any known viscose supplied for the production of cellophane. Viscose used in the fibrous casings is required to possess adhesion force to fibres forming a base paper as well as toughness of the regenerated cellulose film per se. In the non-fibrous casings of the present invention, on the other hand, viscose is required which is only capable of reinforcing film and thus unformly xanthated young viscose is desired. Viscose comprising cellulose concentration in the range of from about 7 to about 10% by weight and caustic soda in the range of from about 3 to about 7% by weight is usually employed, as it is stable and thus tractable.

Middle or higher alcohols may include alcohols having $C_3$-$C_{12}$, more preferably $C_3$-$C_5$. Polyhydric alcohols may include ethylene glycol, glycerol and the like. They are used singly or in combination of two or more in the range of from about 15 to about 30% by weight practically to prepare an aqueous coagulation solution, though variable dependent upon production speed and the like.

The addition of ammonium salts to the coagulation solution not only enhances salting out, but also favors smoking of loin roll hams since free alkali is controlled less rapidly than inorganic acids and $NH_3$ gas generated provides cellophane with small air bubbles. Ammonium salts used in the present invention may include ammonium sulfate, ammonium chloride, and the like. The more the amount of ammonium salts become, the better but they are usually employed in the range of from about 10 to about 20% by weight by reason of operation. When excessive free alkali is present, it is preferred to add a small amount of acids such as sulfuric acid and hydrochloric acid to neutralize the reaction solution. Furthermore, small amount of formalin may be added for the adjustment of coagulation speed.

The coagulated film is tensed to expand the width to produce and increase tonghness in horizontal direction in the range of from about 7 to about 50% to the original width by expansion of the elastic ring. Production speed is usually in the range of from about 2 to about 10 m/min., though dependent upon coagulation speed and the like.

When a thicker and tougher cellophane for casings is desired, the cellophane thus obtained may be further subjected to the second coagulation. As the second coagulation solution, a well-known coagulation solution mainly comprising inorganic acids such as sulfuric acid and hydrochloric acid, and metallic salts thereof such as sodium and zinc is employed. Inorganic acid is used in the range of from about 2 to about 5% by weight and the metallic salt thereof is used ranging from about 15 to about 25% by weight to prepare an aqueous coagulation solution. The solidification and regeneration in the second coagulation solution under tension to expand the width of the coagulated film using an expander or cliptenter (a spring or a magnet system is preferred) leads to a tougher cellophane.

Desulfurization, washing, finishing up and the like are followed in accordance with methods well-known for the treatment of cellophane.

The following is an example embodying the present invention, which example is not intended to limit the scope of the invention.

EXAMPLE 1

Figure 1:
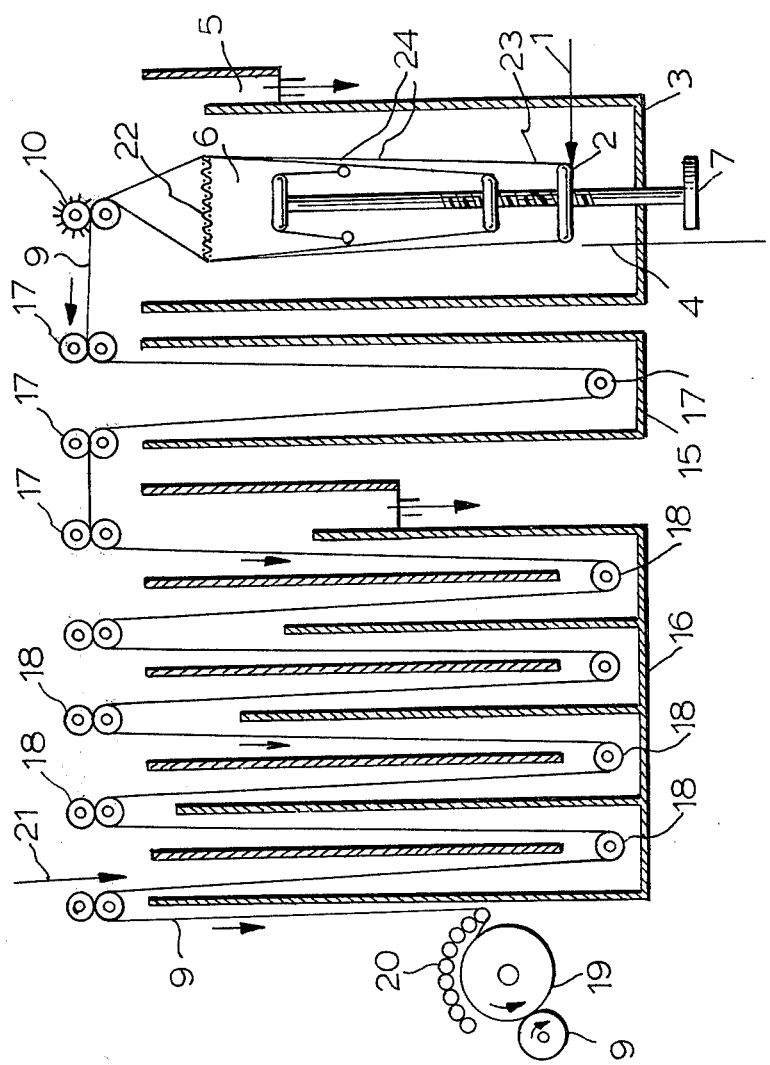
FIG. 1 is a side cross-sectional view of apparatus suitable for carrying out the present invention.

As is examplified in FIG. 1, uniformly xanthated young viscose having cellulose concentration of 9% and caustic soda content of 6% is introduced through a viscose supply pipe (1) and passed through the coagulation solution (3) from the ring slits (2). The coagulation solution comprises an aqueous solution dissolving 25% by weight of ethylene glycol, 10% by weight of ammonium sulfate and 1.5% by weight of sulfuric acid. The released viscose goes up, while being solidified cylindrically, along the coagulation solution stream which is fed through a coagulation solution supply pipe (4) located at the bottom of the first coagulation tank and circulated up to overflow into the overflow gutter (5), in such a manner as to wrap the expander (6) which comprises the up-down movable ring (23), the frame in a form of umbrella (24) supporting the elastic ring (22) and the handle (7) for the adjustment of the frame. The ascending coagulated viscose film (cellophane) is then introduced between the rolls (10) provided with many needles for perforation, thereafter resulting cellophane (9) being led to the desulfurization tank (15) and washing tank (16), subsequently. When the circulation begins to operate smoothly, the elastic ring (22) is expanded bit by bit by 40% based on the original width by means of the handle (7) to form cellophane into a circular cone.

Production speed is 6 m/min. The used coagulation solution overflowed into the overflow gutter (5) is led into the distilling tank (not shown) where it is neutralized with sulfuric acid and $CS_2$ is fractionated. Glycol and salts are filtered and concentrated, then reused.

Cellophane thus obtained is introduced by way of rolls (17) into the desulfurization tank (15) which is filled with an aqueous solution containing about 5% of sodium sulfide (at 40° C.), then into the washing tank (16) by way of rolls (18). Thereafter, cellophane so treated is led to the cylindrical dryer (19) and the product cellophane (9) is coiled, preventing shrinkage or wrinkles by the use of the corniced belt (20).

EXAMPLE 2

Figure 2:
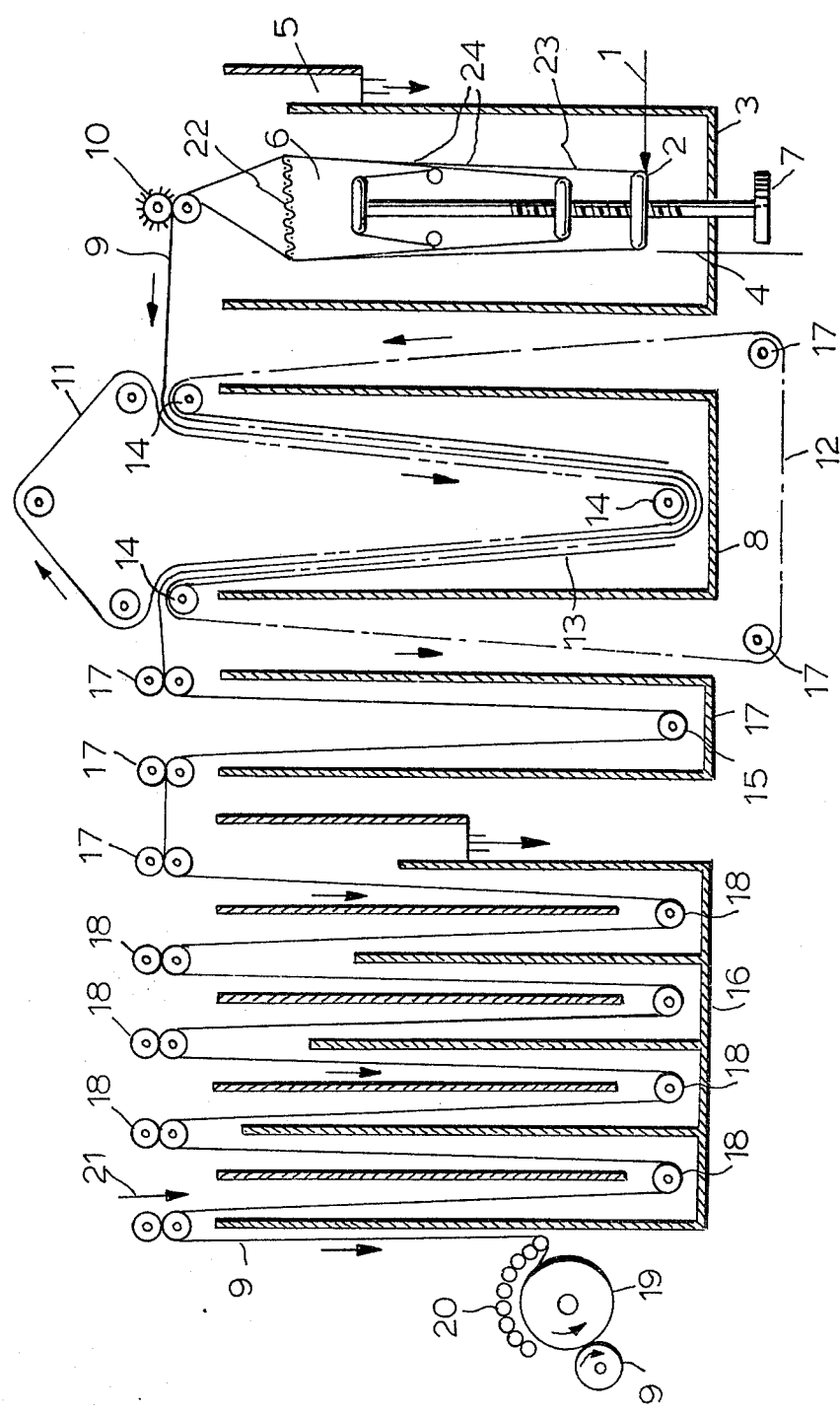
FIG. 2 is a side cross-sectional view of apparatus suitable for carrying out the present invention.
Figure 3:
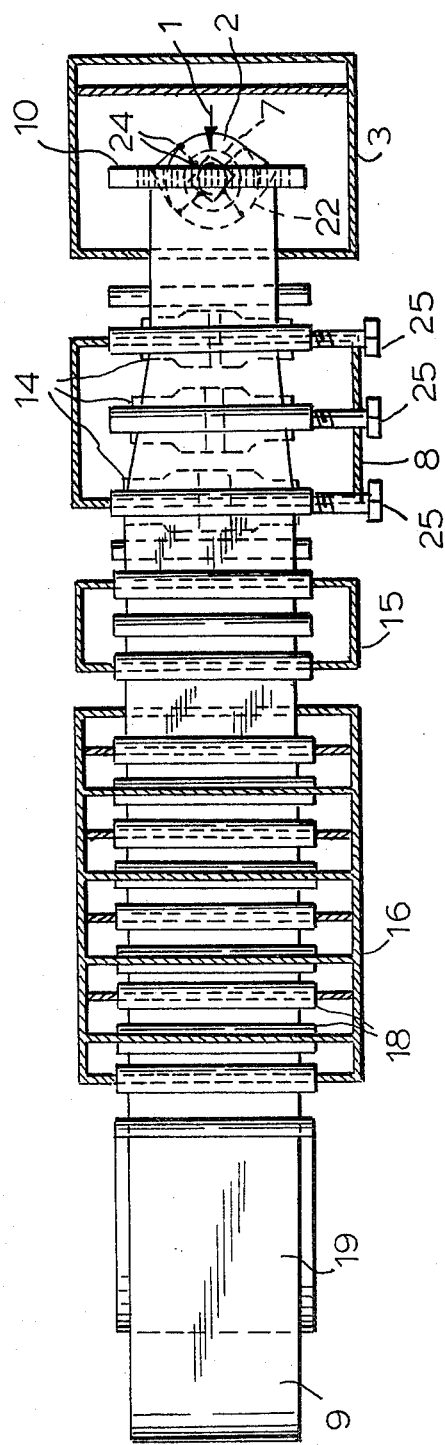
FIG. 3 is a top plan view of apparatus shown in FIG. 2.
Figure 4:
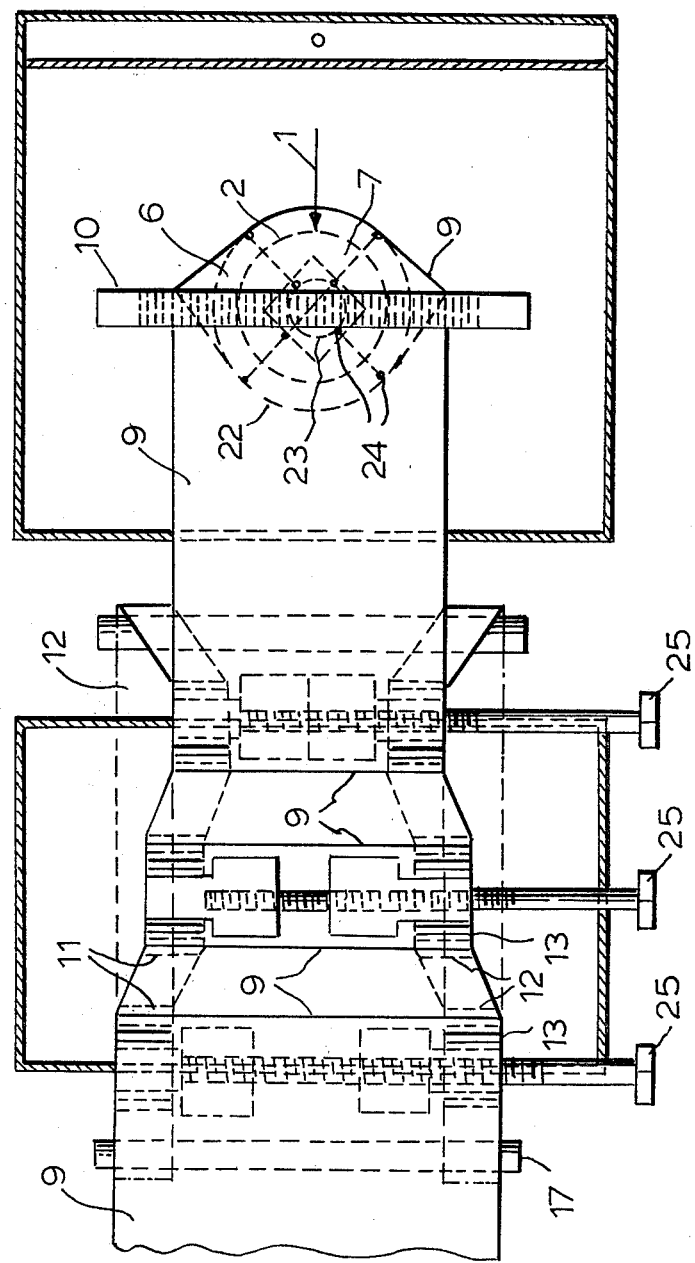
FIG. 4 is a partially enlarged top plan view showing the relation between rolls and belts of apparatus shown in FIG. 2.

As is shown in FIG. 2, FIG. 3 and FIG. 4, uniformly xanthated young viscose having cellulose concentration of 8% and caustic soda content of 5% is introduced through a viscose supply pipe (1) and passed through the first coagulation solution (3) from the ring slits (2). The first coagulation solution comprises an aqueous solution in which 5% by weight of butanol, 15% by weight of ethylene glycol and 15% by weight of ammonium sulfate. A small amount of formalin is added for the adjustment of coagulation speed. The released viscose goes up, while being solidified cylindrically, along the coagulation solution stream which is fed through a coagulation solution supply pipe (4) located at the bottom of the first coagulation tank and circulated up to overflow into the overflow gutter (5), in such a manner as to wrap the expander (6) which comprises the up-down movable ring (23), the frame in a form of umbrella (24) supporting the elastic ring (22) and the handle (7) for the adjustment of the frame. The ascending coagulated viscose film (cellophane) is then introduced between the rolls (10) provided with many needles for perforation, thereafter resulting cellophane (9) being led to the second coagulation solution (8), the desulfurization tank (15) and washing tank (16), subsequently. When the circulation beings to operate smoothly, the elastic ring (22) is expanded bit by bit by 30% based on the original width by means of the handle (7) to form cellophane into a circular cone. Production speed is 3 m/min. The used first coagulation solution is treated, in the same manner as is EXAMPLE 1, then reused. The second coagulation solution comprises an aqueous solution dissolving 20% by weight of sodium sulfate and 4% by weight of sulfuric acid. During the step, the resulting cellophane is subjected to the tenter which comprises the magnet belt (11), the guide belt (12), the guide rail (13), rolls for expanding the width (14) and the handle for the adjustment (25), where the crystallization of non-solidified regenerated cellulose is completed while being expanded by 10 to 25%. Cellophane thus obtained is introduced by way of rolls (17) into the desulfurization tank (15) which is filled with an aqueous solution containing about 7% of sodium sulfide (at 40° C.), then into the washing tank (16) by way of rolls (18). Thereafter, cellophane so treated is led to the cylindrical dryer (19) and the product cellophane (9) is coiled, preventing shrinkage or wrinkles by the use of the corniced belt (2). When the present invention is applied to the existing equipments, the first and the second coagulation tanks and the cliptenter are installed, then the coagulated viscose film is finished up under tension in a suitable width, thereafter both ends of the film being stuck to each other with paste such as activated urethane, polymide, PVA and the like, singly or in combination, to be a cylindrical form.

What is claimed is:

1. In a method of preparation of cellophane for casing wherein viscose is passed through a coagulation solution and then desulfurized, washed and finished, the improvement comprising a first coagulation bath containing a coagulation solution consisting essentially of as active elements 15 to 30 weight percent middle or higher alcohol having 3 to 12 carbon atoms and/or polyhydric alcohol, 10 to 20 weight percent ammonium salt, and an acid in an amount sufficient to neutralize the reaction solution;

wherein the viscose is passed through said solution and is formed in the shape of a tube, and is stretched in the horizontal direction in an amount of from 5 to 50 percent during the process of coagulation during the passage through said coagulation solution;

a second coagulation bath containing a coagulation solution consisting essentially of as active elements an inorganic acid and metallic salt thereof; and wherein said tube is passed through said second bath after passage through said first bath and after being stretched in said first bath during coagulation thereof, and is further stretched in the horizontal direction during the process of coagulation in the second bath and during passage of said tube through said second coagulation solution, employing an expander of a magnetic system type.

2. The method of claim 1, wherein uniformly xanthated young viscose is used.

3. The method of claim 1, wherein said polyhydric alcohol is selected from the group consisting of ethylene glycol, glycerol and the mixtures thereof.

4. The method of claim 1, wherein an ammonium salt is further added to the coagulation solution.

5. The method of claim 4, wherein said ammonium salt is selected from the group consisting of ammonium sulfate, ammonium chloride and the mixtures thereof.

6. The method of claim 1, wherein said inorganic acid is selected from the group consisting of sulfuric acid, hydrochloric acid and the mixtures thereof.

7. The method of claim 1, wherein said metallic salt is selected from the group consisting of sodium or zinc salt.

8. A casing cellophane prepared by the method of claim 1.

* * * * *